United States Patent Office 3,410,054
Patented Nov. 12, 1968

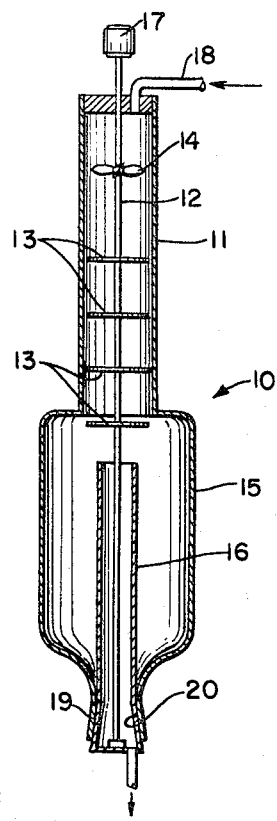
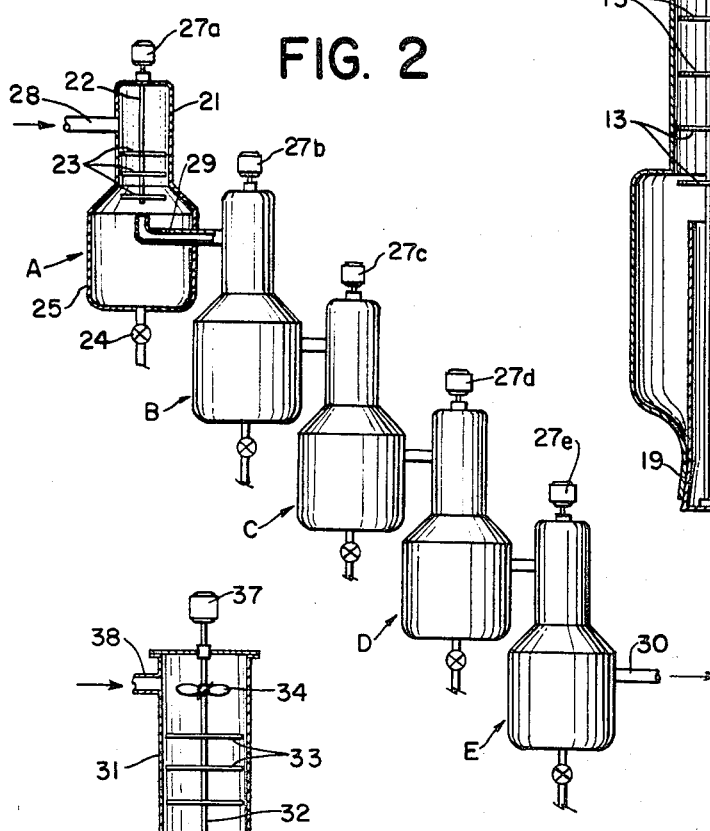
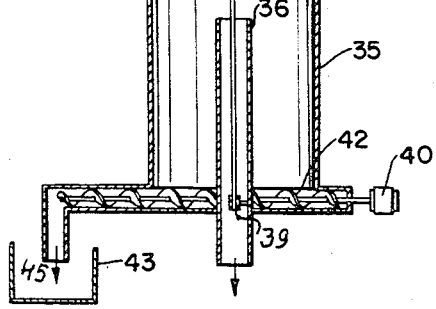
FIG. 1
FIG. 2
FIG. 3
INVENTOR
WILHELM DEITERS

3,410,054
PROCESS FOR AGGLOMERATION OF SUSPENDED PARTICLES IN STREAMING GASES
Wilhelm Deiters, Chur, Grisons, Switzerland, assignor to Inventa A.G. für Forschung und Patentverwertung, Zurich, Switzerland, a Swiss company
Filed May 26, 1966, Ser. No. 553,144
Claims priority, application Switzerland, May 28, 1965, 7,467/65
3 Claims. (Cl. 55—70)

ABSTRACT OF THE DISCLOSURE

A process for the removal of solid polar particles, particularly of ammonium salts, from streaming gases in which they are suspended, by making the particles descend while rotating without eddy formation, whereby said particles agglomerate with each other and are then thrust out continuously and collected, while said gases escape in a pure state.

---

It is a known phenomenon that participants of a reaction, or their conversion products, which react in the absence of liquids or solvents in a gas-filled space, will in the course of the reaction become suspended in the gas, for instance air, and form with said gas a dispersion of considerable stability. They are frequently entrained with the waste gases as undesirable dusts, smokes, or mists, thus reducing the yields of the reacted substances and rendering difficult the further work-up of the gases e.g. compression, thereby causing harmful pollution of the waste gas.

Attempts have therefore been made to overcome the objectionable formation of smoke, dust, or mist by precipitation of the suspended particles.

In general the systems designated as dust, smoke, or mist are aerosols of solid material in gas (dust, smoke), or liquid in gas (mist); in other words, these are colloid systems in a gaseous dispersion agent. For separating the solid or liquid suspended matter from the gas in such aerosol systems, many methods have been used, including dry or wet mechanical methods, electrostatic or chemical separation, absorption, and the like.

Dry mechanical means are for instance dust chambers, in which the rate of gas flow is reduced; or the installation of baffles, cyclones or concave filters (Henglein, "Grundriss der chemischen Technik," 1949, p. 72.) Wet mechanical means are dust chambers with showers, trickle pipes, or venturi tubes. Also stationary or rotating gas scrubbers, oil soaked filters; furthermore electrostatic means e.g. Siemens-Lurgi-Cottrell electro-filters (described in Ullmann, "Enzyklopädie der technischen Chemie," 1951, vol. I, pp. 378–386). The use of such filters is increasing for dry aerosol separation, too.

The effectiveness of the known processes for the separation of suspended solid matter from streaming gases depends primarily on the particle size of said solids. For coarse dust particles, filters, screens, packed layers, or settling chambers will be sufficient, in general, in order to achieve at least a high overall degree of purification. It is true that the dust removal of some fractions is so poor that the smaller particles will remain dispersed in the gas as smoke or mist.

Good results are obtained with baffle plates, particularly in the presence of condensable liquids. The same is true for direction-changing and speed-changing devices, as well as centrifugal sifters and eddy separators which are widely used in the form of cyclones and multiple cyclones. However, even with strong centrifugal forces it is in most cases impossible to separate out the finest particles.

For precipitating even finest suspended particles from aerosols, electro-filters have been introduced in industrial plants, which accomplish electrostatic precipitation to a very high degree (up to 98%) in comparatively short time. It is true that the high expense for installation of such equipment will only pay off with units of very large capacity.

For industrial plants of medium size so far there is no device available for the precipitation of particles suspended in gas, particularly when water-free chemical reactions are concerned in which purity is more important than the revolution of large gas masses. Even when in the reaction vessel a dry salt aerosol, in which the maximum of the statistic grain size distribution lies at a diameter of about $10\mu$ is treated under conditions similar to the ones obtaining in a cyclone, namely by centrifugation of the moving gas column, only the coarsest particles will be thrust out; these will not adhere to the walls or the vessel, particularly if they are smooth, but will be entrained again into the flow of gas.

By far the largest portion of pulverulent gas impurities is caused by mechanical comminution of the processed solids such as coal, ashes, ores, gangue materials, oxidation and reduction products, and so on. These are mostly easy to separate, since only few of the mentioned substances are typical aerosol forming materials. The latter are, however, the evaporated and sublimated suspended particles from metallurgical plants, sintering installations, converters, electric arc furnaces and so on.

It is the object of the present invention to provide a process for the removal of suspended particles from gases which is free of the drawbacks encountered in methods hitherto used for the purpose in question.

It is another object to provide a process for the removal of solid particles from gases in which they are suspended by simple and inexpensive means, thereby rendering the gases pure and more suitable for further processing.

Other objects and advantages of the present invention will become apparent from the following detailed description in connection with the accompanying drawings.

With the above objects in view, it has been found that particles suspended in streaming gases can be agglomerated, particularly such particles which are capable of growing together, when causing the gas to revolve, while preventing eddy formation, in such a manner that stationary agglomeration centers will be formed which rotate about their center axis and from which the agglomerated particles will be thrust out continuously. In order to make the agglomeration complete, all particles are maintained in suspension as long as possible. This leads to the formation of condensed rings of aerosol which form a favorable zone of agglomeration for small residual portions. Aerosols formed in this manner can be well agglomerated after having remained in suspension for a sufficient period—they are comparable to vapors resulting from chemical reactions occurring at high temperatures—and they are thus brought into a condition for ready precipitation.

The tendency for agglomeration exists particularly in aerosols consisting of polar or polarizable suspended particles. The above mentioned formation of condensed aerosol rings may be brought about by a completely smooth rotation of the gas column avoiding any form of eddy formation, rotating the gas by using neither injection nozzles, nor stirrers or wings, but by employing smooth discs rotating at right angles to the shaft, which will take the gas along by friction. In this manner, a gas column is generated rotating about the axis entirely free of eddy formation, the column advancing at a desired slow rate in the direction of the shaft and affording an opportunity to the solid particles of concentrating in aerosol rings which lead to their agglomeration. To avoid eddy formation it is necessary that the walls of the vessels are smooth. The length of the column and the number of agglomeration steps depends on the type of suspended particle and the conditions of operation, as more fully explained hereinbelow.

In the accompanying drawings, three different embodiments of an apparatus are shown by way of example, but it should be understood that these are given by way of illustration, and not of limitation.

In the drawings:

FIG. 1 is a schematic showing in elevation of an apparatus for carrying out the process according to the invention, with a single separating tower;

FIG. 2 illustrates an apparatus comprising a cascade arrangement of separating units; and FIG. 3 is a similar apparatus as the one shown in FIG. 1, with some modifications.

Referring now to FIG. 1, an elongated cylindrical vessel is generally designated at 10; it consists of a narrower upper part 11 and a wider lower part 15. Centrally arranged in the vessel is a shaft 12, said shaft being mounted for rotation by drive means 17. Disposed on shaft 12 is a number of horizontal discs 13. The uppermost portion of cylinder 11 is free of such discs, since it serves for receiving gas through an inlet pipe 18 in such a manner that separation of solid particles from the gas is at first avoided. Shaft 12 also carries blades 14 provided for rotating the gas in the upper portion of the cylinder.

The bottom of the vessel designated by 15 is to serve as collecting and settling chamber for the separated particles. It is much wider, about 2–2.5 times the diameter, of the upper portion 11.

The gas, substantially free of suspended particles leaves the apparatus by a discharge tube 16. The tube is fitted at 19 into the chamber 15 to serve as a stopper while the separated solid particles are collecting in the chamber. When removal of the particles and cleaning of chamber 15 becomes desirable, tube 16 may be withdrawn to open a discharge outlet 20.

FIG. 2 shows a cascade arrangement of several units A, B, C, D, E all of which are designed in the same manner. The unit A comprises a device similar to the one in FIG. 1 having a narrow top portion 21 and a wider bottom portion 25 which serves as a collecting chamber for separated solid particles. A shaft 22 is mounted for rotation by drive means 27. Arranged on the shaft 22 are horizontal discs 23. An inlet pipe 28 is provided for admitting gas with particles suspended therein. A collecting pipe 29 leads from the lower portion 25 of unit A to the following unit B. The drive means for each unit, 27a–27e, are individually controllable.

The last unit E is equipped with an outlet tube 30 through which purified gas free of suspended particles will escape. Each unit A–E is provided with a shut-off valve means 24 for removal of the separated solids.

FIG. 3, as mentioned before, is a similar apparatus to the one shown in FIG. 1. However, it is considerably higher and comprises a larger number of discs for rotation. It is furthermore equipped with a screw for discharge of solid particles.

Referring now to FIG. 3, a vertical cylinder, which is illustrated with a part broken off is designated by 31, and mounted therein for rotation is a shaft 32 which passes down the entire length of the apparatus. It is mounted for rotation in bearings 39, and is driven by motor 37. Arranged in superposed position on the shaft are horizontal discs 33. In its upper portion, the shaft carries blades 34. An inlet tube 38 is provided for admission of gas to be freed of suspended particles, an outlet tube for pure gas is shown at 36.

The bottom part 35 of the apparatus is again of wider cross section and serves as a settling chamber for separated solid particles. The chamber merges at the bottom into a channel in which a screw-shaped member 42 is arranged for feeding the solid particles out of the chamber at 45 into a collector 43. A motor 40 is provided as a drive for the screw member.

In the following the unbracketed numerals are referring to FIG. 1, the bracketed ones to FIG. 3.

Generally speaking, the method in accordance with the invention is carried out as follows. Assuming that a dry air-NH$_3$ mixture is present containing finely distributed ammonium sulfate aerosol as it is formed e.g. in the processing of ammonium sulfate liquors during the oxim re-arrangement resulting in caprolactam; the crude gas is made to pass through a vertical cylinder, such as the one described in FIG. 1 or FIG. 3 at a temperature of about 50° C.

The horizontally arranged rotating plates 13(33) having a peripheral rate of about 2000–4000 m./min. will cause the gas to rotate evenly so that rings of mist will form between the discs. In these ring zones, agglomeration of the solid particles will occur progressively so that after having passed through a number of steps the entire aerosol is obtained in precipitable grain size. For this purpose it has been found advantageous—depending on the statistically determined distribution in the crude gas—to provide four or more discs the number of which can be increased as necessary, since the energy consumption is very low. The spacing of the discs should amount to about 75–80% of the cylinder diameter. In the free center space of the cylinder, the rate of flow is about 0.008–0.009 m./sec., and in the annular space between the rim of the discs and the wall of the vessel, about 0.04 m./sec. As the gas descends from step to step, the agglomerated particles are entrained and finally thrust into the settling chamber 15(35) surrounding the gas discharge tube 16(36). The continuous or periodic discharge of the particles is possible without the very delicate agglomeration process being disturbed. As mentioned before, it is favorable for the agglomeration process to maintain the particles in suspension as long as possible, because dense agglomeration rings are thus formed which are good agglomeration zones for the residual smaller portions.

The height of the collecting chamber 15(35) should be about 4.5–5.0 times the cylinder diameter, the diameter of chamber 5, 2–2.5 of the diameter of the cylinder. The distance of the last disc from the gas discharge tube 16(36), as well as that from the upper edge of chamber 15 are important for the clear separation of gas and solids. If they are properly chosen, it will be possible to liberate the gas continuously from ammonium sulfate and to recover the latter, the operational conditions being constant.

On the other hand, a variation of the operational conditions will permit all particles suspended in fine suspension in a carrier gas to be precipitated if they are capable of agglomeration. For instance, from an ammonium chloride aerosol the entire ammonium chloride can be separated as agglomerate, by using the arrangement of FIG. 2. There are 5 units each having two rotating discs 23. In this case, again, it is necessary to avoid distributing eddy formation, as it could be brought about by a propeller or wrong design of the vessel walls, which is not suitable for obstruction-free rotation of the gas column. In this case, too, the wall has to be so smooth that no particles will adhere thereto.

The method according to the invention is applicable to all chemical and technical processes in which aerosols capable of agglomeration—in general of polar nature—should be removed from reaction or carrier gases. More particularly is the method of advantage, when it is less important to recover large masses of coarse dust, particles, let us say the easily separable 95–98%, than when the last traces of finest particles should be removed, so that gas of highest purity is obtained. The method is of special value for the removal of suspended particles from completely dry gases which, as well known, is hardest to achieve and requires great expenditures in energy and high costs; a comparison of electrostatic separation in dry and wet state shows this very clearly.

The method is well adaptable to continuous as well as periodic removal of the solids. This type of operation corresponds to the observation that upon short-time decrease in r.p.m. the aerosol ring will drop and the solid particles can be collected in the settling chamber. When the r.p.m. is again increased, new formation of aerosol rings takes place.

If it is desired to purify a gas without interruption, following this principle, the cylinder may be subdivided in several units for instance 5, with two discs each (see FIG. 2). Each unit has its rotor and its collecting chamber. The rings may be freed of suspended particles rhythmically, so that while one unit is emptied, the other four continue operating.

When the concentration of solids is very low, it is advantageous to provide an additional core for agglomeration, for instance very finely divided asbestos wool.

As compared to the known methods the one according to the invention has the advantage that the aptitude for agglomeration can be used in all cases where it exists and apparatus can be adapted thereto. The agglomerates are neither water-free nor are they soaked in oil, but they are pure and can be recovered directly and without intermediate purification.

The main advantage over the known dust removal methods operating by centrifugal force is due to the independence from the flow-energy contained in the gas supplied to the apparatus since the rotation of the gas column needed for the formation of the aerosol rings and for the separation of the agglomerated particles is entirely effected by the rotating discs.

As compared to the electrostatic precipitation, the present method has the advantage of being economical for any size of space while electrostatic precipitation installations are only to be used in technical plants of very large capacity. Furthermore, these installations consume additional electricity and require the associated safety measures.

The method of agglomeration in accordance with the invention is best used when applied to large-scale industrial high temperature processes e.g. in the glass industry, metallurgical processes, and cement industry.

In the following, the invention will be more fully explained in a number of examples, which are given by way of illustration, but not of limitation.

EXAMPLE 1

A very fine aerosol of ammonium sulfate which is difficult to separate from the gas, is obtained when completely anhydrous ammonium bisulfate, evaporated at 400–450° C., is reacted with ammonia in a current of air. The example will be described with reference to the apparatus illustrated in FIG. 1.

An aerosol as mentioned above, which contains per liter about 0.3 g. ammonium sulfate, is passed from inlet 18 through the cylinder 11 at a rate of flow of about 100 liter/hour and a temperature of 50° C. The cylinder which consists of glass has a height of about 300 mm. Shaft 12 with discs 13 is rotated at 5000 r.p.m.

In the uppermost portion of the cylinder, the blades 14 effect a stirring of the gas, in order to prevent precipitation of some of the solid particles on the glass wall. The blades 14 are slightly inclined downwardly, exerting a light pressure on the aerosol while it descends. The aerosol then passes through the several zones of agglomeration, where the solid particles are concentrated and finally, upon reaching the settling chamber 15, are deposited therein, while the pure gas free of particles leaves the apparatus through discharge tube 16. The tube has a diameter of about 35 mm. and its top opening is spaced at 45 mm. from the inlet to chamber 15.

The rotating discs have a diameter of 58 mm. and are spaced by 50 mm. from each other. The glass cylinder 11 has an inner diameter of 65 mm. The chamber 15 has a diameter of 140 mm. and a height of about 300 mm. The lowermost of the discs 13 extends 8 mm. into chamber 15.

In operation, aerosol rings are formed between the discs 13, as mentioned before, and the mean grain size of the suspended particles increases downwardly from ring to ring due to advancing agglomeration.

When the agglomerates reach a certain size, they are thrust out in spirals and arrive finally in the settling chamber 15 into which the agglomerates from the bottom discs 13 are also thrown. In the case of the ammonium sulfate aerosol here described four rotating discs 13 are required. In the settling chamber, about 95% by weight of the ammonium sulfate will have collected; the balance is adhering to parts of the apparatus. The gas is completely free of sulfate.

EXAMPLE 2

This example relates to separation of air from a $NH_4Cl$ aerosol prepared by addition of dry HCl gas to a mixture of air and $NH_3$, the latter stoichiometrically in excess; the aerosol contains 420 mg. $NH_4Cl$ per 100 liter air. The description refers to the apparatus illustrated in FIGURE 2 of the drawing.

100 liters of the aerosol are passed hourly through the five serially connected units A–E at a temperature of 40° C. Each of the units has two discs 23 mounted at a spacing of 50 mm. on a rotating shaft 22. The diameter of the cylinders 21 is 65 mm., the diameter of the discs 58 mm. While the gas is descending, the rotation of the discs in all units is at 5000 r.p.m.; however, after the formation of saturated aerosol rings is achieved, the rotation in one of the units is reduced to 3000 r.p.m. for a short time and again brought up to 5000 r.p.m. immediately. This causes solids to be deposited in chamber 25 of the one unit. In This manner the gas in all five units is freed of solid particles successively, one unit at a time. By emptying the chambers 25 of the five units, a total of about 92% by weight of $NH_4Cl$ are recovered as light powder. The balance is distributed on the walls of the apparatus. When the escaping gas is subjected to analysis, it shows complete desalting, consequently the intermittent discharge of dust particles has not caused any disturbance of the purification process.

EXAMPLE 3

This example will be described with reference to FIG. 3.

2 $Nm^3$ of an anhydrous mixture of 20% $NH_3$ and 80% air which contains 4.2 g. ammonium sulfate as very fine mist, is passed hourly at 60° C. downward through a vertical cylinder 31 consisting of steel. The rate of speed is as in Example 1.

Twelve discs made of smooth steel are attached to shaft 32 which rotates at about 2000 r.p.m.

In order to avoid precipitation of coarser particles in the upper part of cylinder 31, the gas is stirred by blades 34 before entering the agglomeration zones, the slight inclination of the blades exerting a downward pressure. The height of cylinder 31 is 291 mm., the discs have a diameter of 259 mm. and are spaced from each other by 225 mm.

After passing through the agglomeration zones, the pure gas escapes through discharge tube 36 which is surrounded by a settling chamber 35 of a height of 1350 mm. and a diameter of 630 mm. The bottom discs 33 extends into the settling chamber 35 for 36 mm. The gas discharge tube has a diameter of 160 mm. and it has its upper end 200 mm. below the top of the settling chamber.

After several hours of operation, analysis of the escaping gas will show that no solid salt particles are present in the gas. The solids discharged by screw 42 into the collector 43 are in form of a loose powder which is obtained in a yield of 97% by weight. The balance adheres to the walls of the cylinder.

While I have described several embodiments of my invention it should be understood that many modifications thereof are possible without departing from the spirit of the invention. The invention should therefore not be limited to the specific embodiments here described except as defined by the appended claims.

What I claim is:

1. Process for the separation from a gas stream of finely divided solid particles of an ammonium salt suspended therein, said particles being capable of agglomeration, comprising the steps of:
    (a) continuously moving a stream of said particle-laden gas downwardly into and through a separation zone while imparting a rotational motion to said stream;
    (b) moving said rotating stream downwardly within said separation zone, the temperature within said separation zone lying between about 40° C. and about 60° C., at a downward flow velocity between about 0.008 and about 0.009 meters per second, through a succession of agglomeration zones positioned therein at a speed permitting smooth rotation of the gas stream body with avoidance of eddy formation and permitting said solid particles to agglomerate progressively so that substantially the entire suspension thereof is obtained in a separable particle size; and
    (c) continuously recovering the agglomerated solid particles and purified gas from said separation zone.

2. The process of claim 1, in which the ammonium salt is ammonium sulfate.

3. The process of claim 1, in which the ammonium salt is ammonium chloride.

References Cited

UNITED STATES PATENTS

| | | | |
|---|---|---|---|
| 2,633,930 | 4/1953 | Carter | 55—403 |
| 2,754,970 | 7/1953 | Ross | 210—512 |
| 2,803,524 | 8/1957 | Deutschman, et al. | 23—100 |
| 2,840,185 | 6/1958 | Norgren | 55—342 |
| 2,901,324 | 8/1959 | Howell | 55—342 |
| 3,038,783 | 6/1962 | Arita | 23—100 |

FOREIGN PATENTS

| | | |
|---|---|---|
| 671,865 | 3/1939 | Germany. |

REUBEN FRIEDMAN, *Primary Examiner.*

C. N. HART, *Assistant Examiner.*